United States Patent
Levy et al.

(10) Patent No.: US 11,010,988 B2
(45) Date of Patent: May 18, 2021

(54) METHOD, SYSTEM AND PRODUCT FOR AUTOMATIC PARKING PAYMENT AND POLICY DETECTION

(71) Applicant: Anagog Ltd., Ramat Gan (IL)

(72) Inventors: Gil Levy, Ramot Meir (IL); Yaron Aizenbud, Haifa (IL)

(73) Assignee: Anagog Ltd., Ramat Meir (IL)

( * ) Notice: Subject to any disclaimer, the term of this patent is extended or adjusted under 35 U.S.C. 154(b) by 1085 days.

(21) Appl. No.: 15/030,363

(22) PCT Filed: Oct. 19, 2014

(86) PCT No.: PCT/IL2014/050904
§ 371 (c)(1),
(2) Date: Apr. 18, 2016

(87) PCT Pub. No.: WO2015/056269
PCT Pub. Date: Apr. 23, 2015

(65) Prior Publication Data
US 2016/0284137 A1    Sep. 29, 2016

Related U.S. Application Data

(60) Provisional application No. 61/893,240, filed on Oct. 20, 2013.

(51) Int. Cl.
*G07B 15/02* (2011.01)
*H04W 4/029* (2018.01)
(Continued)

(52) U.S. Cl.
CPC ......... *G07B 15/02* (2013.01); *G06F 16/2379* (2019.01); *G06F 16/9537* (2019.01);
(Continued)

(58) Field of Classification Search
CPC ...... G07B 15/02; H04W 4/021; H04W 4/029; G06F 16/2379; G06F 16/9537;
(Continued)

(56) References Cited

U.S. PATENT DOCUMENTS

| 6,081,206 A * | 6/2000 | Kielland ............ G06Q 30/0284 194/902 |
| 2004/0094619 A1 * | 5/2004 | Silberberg .......... G07F 17/0014 235/382 |

(Continued)

FOREIGN PATENT DOCUMENTS

| EP | 2530653 A1 | 12/2012 |
| WO | 2005086097 A1 | 9/2005 |
| WO | 2013037053 A1 | 3/2013 |

OTHER PUBLICATIONS

"Determination of the parking place availability using manual data collection enriched by crowdsourced in-vehicle data" Martin Margreiter, Jul. 2016, ScienceDirect (Year: 2016).*

(Continued)

*Primary Examiner* — Kevin H Flynn
*Assistant Examiner* — Ismail A Manejwala

(57) ABSTRACT

Method, system and product for automatic parking payment and policy detection. One method comprises detecting a parking event, querying a parking policy database to obtain a parking policy for the parking location, wherein the parking policy indicates that the parking location is a paid parking spot; and initiating, either automatically or semi-automatically, a parking payment service for parking of the vehicle in the parking location based on the parking policy, wherein said initiating is performed by the mobile device. Another method comprises detecting a parking exit event, wherein the exit parking event is associated with a parking (Continued)

location that is a paid parking location; automatically determining whether a parking payment service is being used by the user for the paid parking location; and stopping the parking payment service for the paid parking location.

16 Claims, 5 Drawing Sheets

(51) Int. Cl.
*H04W 4/021* (2018.01)
*G06F 16/23* (2019.01)
*G06F 16/9537* (2019.01)
*G06Q 20/32* (2012.01)
*H04L 29/08* (2006.01)
*G06Q 20/10* (2012.01)
*G06Q 20/14* (2012.01)

(52) U.S. Cl.
CPC ......... *G06Q 20/102* (2013.01); *G06Q 20/145* (2013.01); *G06Q 20/32* (2013.01); *H04L 67/26* (2013.01); *H04W 4/021* (2013.01); *H04W 4/029* (2018.02)

(58) Field of Classification Search
CPC .... G06Q 20/145; G06Q 20/102; G06Q 20/32; H04L 67/26
See application file for complete search history.

(56) References Cited

U.S. PATENT DOCUMENTS

| 2009/0005082 A1* | 1/2009 | Forstall | G01C 21/26 |
| | | | 455/456.5 |
| 2009/0248577 A1* | 10/2009 | Hoj | G06Q 20/102 |
| | | | 705/40 |
| 2010/0052946 A1* | 3/2010 | Levine | G08G 1/143 |
| | | | 340/932.2 |
| 2012/0188101 A1 | 7/2012 | Ganot | |
| 2013/0304758 A1* | 11/2013 | Gruber | G06F 16/9535 |
| | | | 707/769 |
| 2014/0266800 A1* | 9/2014 | Koukoumidis | G08G 1/141 |
| | | | 340/932.2 |
| 2020/0257909 A1* | 8/2020 | Korman | G08G 1/143 |

OTHER PUBLICATIONS

International Search Report and Written Opinion of ISA for PCT/IL2014/050904 (dated Mar. 12, 2015).

* cited by examiner

METHOD, SYSTEM AND PRODUCT FOR AUTOMATIC PARKING PAYMENT AND POLICY DETECTION

CROSS-REFERENCE TO RELATED APPLICATION

This application claims the benefit of U.S. Provisional application No. 61/893,240 filed Oct. 20, 2013, entitled "Automatic Parking Reminders", which is hereby incorporated by reference in its entirety.

TECHNICAL FIELD

The present disclosure relates to mobile devices, in general, and to utilization of mobile devices as sensors for vehicles, in particular.

BACKGROUND

In many cities there are spaces for on street parking. In some places the local municipalities charge for parking. In order to make the payment process easier payment services have been made possible using mobile devices. The payment can be made by calling a predetermined number, sending a text message, or operating a mobile app.

This process is relatively simple and easy for the driver, however it may happen that the driver forgets to activate the parking payment after he parked or drives away from the parking spot and forgets to stop the parking payment service. Such forgetfulness is a downside of service, as drivers may spend extra money for parking they are not using any more or pay fines when forgetting to pay.

In addition, parking restrictions, rules and policy may vary from place to place. Such restrictions may also be unclear and potentially difficult to understand.

BRIEF SUMMARY

One exemplary embodiment of the disclosed subject matter is a method comprising: detecting a parking event, wherein said detecting is performed by a mobile device of a user located within a vehicle, wherein the parking event is associated with a parking location; querying a parking policy database to obtain a parking policy for the parking location, wherein the parking policy indicates that the parking location is a paid parking spot; and initiating, either automatically or semi-automatically, a parking payment service for parking of the vehicle in the parking location based on the parking policy, wherein said initiating is performed by the mobile device.

Another exemplary embodiment of the disclosed subject matter is a method comprising: detecting a parking exit event, wherein said detecting is performed by a mobile device of a user located within a vehicle, wherein the exit parking event is associated with a parking location that is a paid parking location; automatically determining whether a parking payment service is being used by the user for the paid parking location; and stopping, either automatically or semi-automatically, the parking payment service for the paid parking location.

Yet another exemplary embodiment of the disclosed subject matter is a method comprising: detecting a parking event, wherein said detecting is performed by a mobile device of a user located within a vehicle, wherein the parking event is associated with a parking location; querying a parking policy database to obtain a parking policy for the parking location, wherein the parking policy indicates that the parking location is a prohibited parking spot; and alerting the user of the prohibited parking spot.

Yet another exemplary embodiment of the disclosed subject matter is a method performed by a server having a processor, wherein the server is connected to a computerized network to which mobile devices are connected, wherein said method comprises: receiving, over time, reports from the mobile devices, wherein the reports are indicative of parking sessions of vehicles of users of the mobile devices; segmenting a geographical zone into road segments; computing a statistical measurement for each road segment, wherein the statistical measurement is indicative of a parking policy in the road segment; computing the statistical measurement for the geographical zone; and automatically determining the parking policy in each road segment based on a relation between the statistical measurement of the road segment and between the statistical measurement of the geographical zone.

Yet another exemplary embodiment of the disclosed subject matter is a

A method performed by a computing device deployed in a vehicle, wherein said method comprises: sending a query from the computing device to a remote server retaining a parking policy database, wherein the query comprises a location of the vehicle which is determined by a positioning module of the computing device; retrieving a response to the query indicating a parking policy at the location; and utilizing a display of the computing device to indicate the parking policy to a user located within the vehicle.

Yet another exemplary embodiment of the disclosed subject matter is a mobile device having a processor, wherein the mobile device is a device of a user, wherein the user is located within a vehicle, wherein the processor being adapted to perform the steps of: detecting a parking event, wherein the parking event is associated with a parking location; querying a parking policy database to obtain a parking policy for the parking location, wherein the parking policy indicates that the parking location is a paid parking spot; and initiating, either automatically or semi-automatically, a parking payment service for parking of the vehicle in the parking location based on the parking policy.

Yet another exemplary embodiment of the disclosed subject matter is a mobile device having a processor, wherein the mobile device is a device of a user, wherein the user is located within a vehicle, wherein the processor being adapted to perform the steps of: detecting a parking exit event, wherein said detecting is performed by a mobile device of a user located within a vehicle, wherein the exit parking event is associated with a parking location that is a paid parking location; automatically determining whether a parking payment service is being used by the user for the paid parking location; and stopping, either automatically or semi-automatically, the parking payment service for the paid parking location.

Yet another exemplary embodiment of the disclosed subject matter is a server having a processor, wherein the server is connected to a computerized network to which mobile devices are connected, wherein the processor being adapted to perform the steps of: receiving, over time, reports from the mobile devices, wherein the reports are indicative of parking sessions of vehicles of users of the mobile devices; segmenting a geographical zone into road segments; computing a statistical measurement for each road segment, wherein the statistical measurement is indicative of a parking policy in the road segment; computing the statistical measurement for the geographical zone; automatically determining the parking policy in each road segment based on a relation between the statistical measurement of the road segment and between the statistical measurement of the geographical zone.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
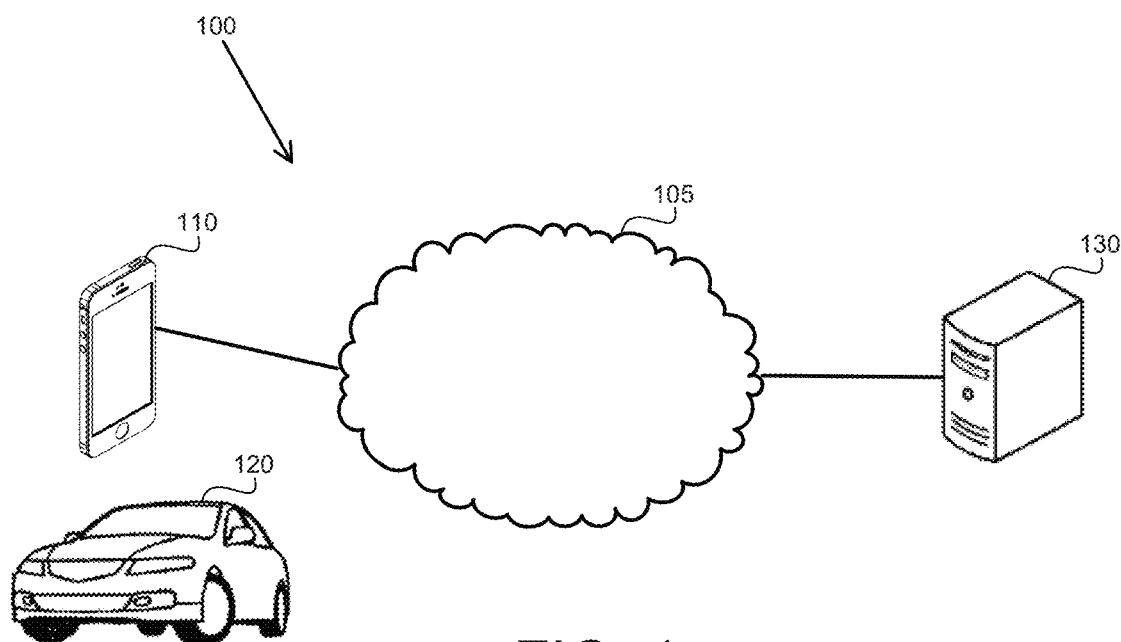
FIG. 1 shows an illustration of a computerized environment, in accordance with some exemplary embodiments of the disclosed subject matter.

In the present disclosure, a "mobile device" is a device that is carried by a user, such as a mobile phone, a Personal Digital Assistant (PDA), a tablet computer, or the like. The mobile device may have computing capabilities and may comprise sensors, such as but not limited to positioning module, an accelerometer, an RF receiver, or the like.

In the present disclosure, a "positioning module" is a module capable of determining a position of the mobile device. The positioning module may be, for example, a GPS receiver that utilizes GPS signals to determine location. As another example, the positioning module may determine the location of the mobile device based on triangulation of signals from cell towers, Wi-Fi networks or the like. Other positioning methods, which may provide a more or less precise location of the mobile device, may be utilized as well.

In the present disclosure, a "parking event" is an event in which a mobile device of a user determines, e.g., based on information from its sensors, that a vehicle has parked. The parking event may be determined, for example, based on readings of an accelerometer that are indicative of either a driving status or a non-driving status. A switch between a driving status and a non-driving status (e.g., walking status) may be an indication of a parking event. In some cases, the non-driving status may be based on a detection of a walking status which may be an indication of a non-driving status. Other sensors, such as a positioning module, may be utilized by the mobile device to determine the parking event.

In the present disclosure, a "parking exit event" is an event in which a mobile device of a user determined, e.g., based on information from its sensors, that a vehicle has exited a parking spot. The parking exit event may be based on readings of an accelerometer that are indicative of a change from a non-driving status to a driving status.

In the present disclosure, a "parking session" is a session during which a vehicle is parked in a location. The parking session may be detected by detecting a parking event in the beginning and detecting a parking exit event in the end, both of which are occurring in the location. The parking session may be associated with parking cost, which may be based on some predetermined rate. Duration of the parking session may be a time between the parking of the vehicle and exiting with the vehicle.

In the present disclosure, an "overnight parking session" is a parking session that is generally consistent with a driver sleeping during the night. An overnight parking session may begin in the afternoon, the evening or at night and end after the following morning. An overnight parking session may begin after a first time (e.g., 16:00) but before a second time (e.g., 04:00 of the following day) and ends after a third time (e.g., 06:00). Generally, an overnight parking session may be a parking session of the vehicle while the user is sleeping overnight, and commonly be located near a residence of the user. As an example, an overnight parking session may be a parking session starting at 18:00 and ending at 08:00 of the following day. As another example, a parking session starting at 19:00 and ending at 21:00 of the same day may not be an overnight parking session.

In the present disclosure, a "partial parking session" is said to be detected if a parking event is detect without a following, corresponding, parking exit event. In some cases, a mobile device may automatically detect a parking event when a user steps out of a vehicle, such as when being given a lift. However, a corresponding parking exit event may not be detected in the same location. A relative high rate of partial parking sessions in a location may be generally indicative of a location in which parking is not allowed.

In the present disclosure, a "prohibited parking spot" is a spot in which some vehicles are not allowed to park. As an example, the prohibited parking spot may be a red zone, a towing zone, or the like. As yet another example, the prohibited parking spot may be a partially prohibited parking spot.

In the present disclose, a "partially prohibited parking spot" is a spot in which parking is prohibited on some vehicles but not on others. As an example, a handicapped parking spot is a partially prohibited parking spot. As another example, a parking spot in which only vehicles having a zone indicator of a predetermined zone, may park (with or without payment) is a partially prohibited parking spot. As yet another example, an on-street parking spot that is reserved to a specific vehicle (e.g., having a predetermined plate number) is a partially prohibited parking spot.

In the present disclosure, a "zone-based parking policy" is a parking policy that depends upon a zone indicator of a vehicle. As an example, one zone-based parking policy may be allowing free parking for vehicles having a zone indicator of "zone A" and prohibiting parking of other vehicles. As another example, zone-based parking policy may allow paid parking at a first rate for vehicles having a zone indicator of "zone A", allowing paid parking at a second rate for other vehicles. As yet another example, zone based parking policy may allow free parking to vehicles having zone indicator of "zone A" and allowing paid parking for other vehicles during a predetermined timeframe (e.g., weekdays 9:00-18:00). Zone-based parking policy may relate to more than one zone, such as by setting different rules for each zone, by setting the same rules to different zones, or combination thereof.

One technical problem dealt with by the disclosed subject matter is to provide automatic detection of when a parking payment service should be started or stopped.

Another technical problem dealt with by the disclosed subject matter is to provide a fully automatic system in which the user need not be involved in order to pay for parking. Such an automatic system may be preferable over manual or semi-automatic system as human err is avoided. An additional advantage may be that the user may not be aware in real-time of the costs and therefore may avoid an uncomfortable feeling associated with payment.

Yet another technical problem is to automatically determine parking policies so as to be able to distinguish between allowed parking spots, which may or may not require payment, and spots in which parking is prohibited.

One technical solution is to automatically detect a parking event in a parking location. In response to the detection, a parking policy database, which may be retained in a remote server and accessible over a computerized network, may be queried to obtain a parking policy of the parking location. In case the parking location is determined to be a paid parking spot, a parking payment service may be started based on the parking policy. As an example, the policy may determine a rate of payment which may differ from one on-street parking location to the other.

In some exemplary embodiments, parking payment service may be started automatically, such as using a pre-existing account information of the user and vehicle information of the user. The mobile device may transmit an authorization to the parking payment service to initiate the parking payment service and to deduct the cost from the account.

Additionally or alternatively, an alert may be provided to the user indicating that the parking location requires payment. The alert may remind the user to manually start the parking payment service using a command.

In some cases, the parking policy may indicate that the parking location is a prohibited parking location. An alert may be issued to the user to notify him of the prohibited parking spot. In case the user decides to ignore the alert, the server may be notified so as to enable the server to verify the parking policy which may have changed or may be erroneously deemed as prohibited. In some cases, if the user continues to parking in the same spot, after a predetermined number of parking sessions (e.g., after five parking sessions in the same spot), the alert may not be issued for that user anymore. Based on such behavior, the disclosed subject matter may determine over time that the prohibited parking spot is in fact a partially prohibited parking spot.

In some cases, the parking policy may indicate that the parking location is a partially prohibited parking location. The alert may be issued in case it is determined that the parking location is prohibited for the vehicle of the user.

In some cases, the parking policy may be a time-based parking policy which changes over time. As an example, the parking policy may indicate the parking location is a paid parking location during a first timeframe (e.g., weekends, during evening, etc.) and is a prohibited parking spot at a second timeframe (e.g., during the rest of the time). In some cases, the time-based parking policy may also depend on zoning information, on vehicle information or the like (e.g., partially prohibited parking spot during the second timeframe). In case the user had parked during the first timeframe during which the parking policy allows parking, an alert may be issued to the user to notify the user of the time-based parking policy. The alert may be issued at the time the user parks if the change is expected within a predetermined timeframe, such as within an hour, within two hours, or the like. The predetermined timeframe may be personalized by the user and it may be different at different time (e.g., during the evening, when an over-night parking is expected, the predetermined timeframe may be until 9 am the next morning). Additionally or alternatively, the alert may be issued prior to the change in policy, such as 30 minutes before the change, 10 minutes before the change or the like. The alert may be timed so as to allow the user sufficient time to return to the vehicle and move it. Such timing may be determined based on a distance between the current location of the mobile device, as determined by the positioning module, and the parking location, which may also have been determined by the positioning module.

Another technical solution is to provide a server that receives reports from mobile devices which are indicative of parking sessions. Based on the reports, parking policies may be determined. In some exemplary embodiments, geographical zone, such as a neighborhood, a city, a 5 mile radius area, or the like, may be analyzed. Roads in the geographical zone may be segmented into road segments. The road segments may be substantially straight segments. Additionally or alternatively, the road segments may of a predetermined size or smaller, such as 50 meters, 100 meters, 200 meters, or the like. A statistical measurement may be computed for both the segments and the entire geographical zone and based on the relation between the statistical measurements, a parking policy of each road segment may be determined.

In some cases, a distribution over a road segment, such as non-uniform distribution or non-standard distribution, may be indicative of parking spots in which a specific parking policy is applied, such as a partially prohibited parking spot.

In some exemplary embodiments, based on parking sessions in a road segment zone-based parking policy may be determined. In some cases, a zone of a vehicle may be determined based on overnight parking in specific areas. As an example, if in a specific road segment, the parking sessions between 12:00 and 16:00 are of vehicles which are usually parked overnight in a 5 mile radius, it may be determined that the road segment has a zone-based parking policy in the aforementioned timeframe, and that the zone-base parking policy allows for parking of vehicles from a zone that is associated with the 5 mile radius. As a result, when another vehicle would attempt parking in the road segment during the aforementioned timeframe, it may be automatically determined, based on its common overnight parking area, whether the vehicle is associated with the permitted zone or not. Based on the determination, alert notifying that the parking space is prohibited may be issued to the user or alternatively no alert may be issued if the parking space is available for the vehicle. Additionally or alternatively, payment alert may be issued or payment may commence automatically, in case the parking space requires payment from vehicles of the vehicle's zone.

In some exemplary embodiments, the disclosed subject matter may be utilized in conjunction with a determination that the mobile device is located within a predetermined vehicle. As an example, the determination may be based on detecting a connection between the mobile device and an external device thereto which is mounted on the vehicle. Based on the determined, information of the predetermined vehicle, such as zoning information, disability label, plate number, may be retrieved. In some exemplary embodiments, for each vehicle a different account may be used in the parking payment service.

One technical effect of the disclosed subject matter may be to crowd source mobile devices to determine, without prior knowledge, parking policies of geographical zones. In some cases, by crowd sourcing a continuously monitoring the received information, changes in the parking policies may be detected automatically.

Another technical effect may be to allow for an automatic parking payment system, thereby eliminating human err in forgetting to pay for parking or to turn off parking payment systems.

Yet another technical effect may be to provide for an automatic or semi-automatic system (e.g., an alert-based system) which integrates with any third-party parking payment system. The system may be installed on the user's mobile and may be authorized to charge the user's account in the third-party parking payment system.

Referring now to FIG. 1 showing an illustration of a computerized environment, in accordance with some exemplary embodiments of the disclosed subject matter.

Computerized Environment 100 comprises a Server 130 connected to a Network 105, such as a Local Area Network (LAN), Wide Area Network (WAN), intranet, the Internet, or the like. Server 130 may be a processing device. Server 130 may be configured to obtain and process information from external sources, such as but not limited to mobile devices (e.g., Mobile Device 110).

Mobile Device 110, such as a mobile phone, a PDA, a tablet, or the like, may send information to Server 130 via Network 105. In some cases, Mobile Devices 110 may be a handheld device or otherwise carried by a user. In some exemplary embodiments, Mobile Device 110 may gather information by sensors. A sensor of Mobile Device 110 may be a device measuring any physical property, such as for example, an accelerometer, a positioning module, a gyroscope, a compass, a barometer, a photosensor, sound sensor (e.g., microphone), or the like. The sensors may include RF receivers, Bluetooth receivers or other receivers that are configured to receive signals from external devices, such as, for example, external devices deployed in vehicles, signaling devices deployed at parking spaces used to identify the parking space, or the like.

In some exemplary embodiments, Mobile Device 110 may obtain sensor readings useful for determining a mobility status of Mobile Device 110. "Mobility status" may be a status indicating a mode of movement of Mobile Device 110 or user holding Mobile Device 110. The mobility status may indicate a "driving" status (e.g., Mobile Device 110 is located within a vehicle that is being driven), a "walking" status (e.g., Mobile Device 110 is held by a person that is walking), a "non-driving" status (e.g., Mobile Device 110 is not located within a vehicle being driven), or the like. In some cases, the mobility status may be identified by readings of an accelerometer of Mobile Device 110 and identification of an acceleration curve that is indicative of the mobility status. However, the disclosed subject matter is not limited to such an embodiment, and other sensors may be utilized, such as, for example, a positioning module, in order to determine the mobility status of Mobile Device 110.

In some exemplary embodiments, Mobile Device 110 may be a device of a user (not shown). The identity of the user may or may not be known and available to Server 130. The user may use Vehicle 120. Vehicle 120 may be a vehicle for which parking spot is required, such as but not limited to a car, a bus, a truck, or the like. In some exemplary embodiments, the vehicle may require a parking location which comprises two or more spots, such as in case of a relatively large vehicle. In some exemplary embodiments, the disclosed subject may be applied to 2-wheeled vehicles, such as motorcycles, however as 2-wheeled vehicles may sometimes park on sideways and not in predestinated on-street locations, a system in accordance with the disclosed subject matter may exclude such vehicles.

In some exemplary embodiments, the user may use several vehicles at different times. Mobile Device 110 may determine automatically which vehicle is currently being used, such as based on its sensor readings. In some exemplary embodiments, methods and systems such as described in PCT/IL2014/050674, entitled "ASSOCIATING EXTERNAL DEVICES TO VEHICLES AND USAGE OF SAID ASSOCIATION", filed on 24 Jul. 2014, which is hereby incorporated by reference in its entirety, may be applied. In some cases, one vehicle may be associated with a parking zone and may have different parking rights than other vehicles of different parking zones (or having no parking zone).

Mobile Device 110 may automatically determine parking sessions and partial parking sessions, such as by detecting parking events and parking exit events and comparing their respective locations. Mobile Device 110 may send reports to Server 130 to notify Server 130 of the parking sessions. In some cases, Mobile Device 110 may also provide information regarding usage of parking payment system for the parking sessions. Additionally or alternatively, Mobile Device 110 may report user actions that cancel automatic actions proposed in accordance with the disclosed subject matter, so as to allow Server 130 to learn correct behavior.

Server 130 may be configured to receive reports from mobile devices, such as Mobile Device 110, and to retain information in a data storage. In some exemplary embodiments, Server 130 may be configured to automatically determine parking policies (e.g., in on-street parking) based on the reports. A parking policy database may be created and retained by Server 130. In some exemplary embodiments, Server 130 may aggregate information received from a large number of mobile devices of users to perfect the parking policy database and to modify it as it evolves over time. In some cases, the parking policy database may indicate different policies to different users or different vehicles, such as in case of partially prohibited parking spots, zone-based parking policies, or the like. The different policies may be determined automatically based on the reports which are associated with different users. In some cases, one parking location may have a different policy in different time of day (e.g., between 09:00 and 19:00 and between 19:00 to 09:00), time of week (e.g., a first policy during weekends and a second policy during weekends), or the like. The different policies may be determined automatically based on the reports received at different times. In some exemplary embodiments, the parking policy database may indicate a payment rate in each parking location (which may differ between types of users, types of vehicles, time of day, time of week, or the like). The payment rate may be automatically deduced from the usage of parking payment services by users over time.

The parking policy database of Server 130 may be used to provide automatic reminders, notifications, alerts or similar indications to users. In some cases, a reminder to turn on the payment parking service may be provided only in case the parking policy in the parking location requires payment by the user for his vehicle. Such a reminder may be issued in response to a parking event and in case it is determined that the user has not manually turned on the parking payment service for the parking session. In some cases, a reminder to turn off the payment parking service may be provided. In some cases, a notification may be issued in anticipation of a change in parking policy that would render the parking spot from an allowed parking spot (either with payment or without) to a prohibited parking spot. Such a change may occur over time, such as after 08:00 in the morning.

In some exemplary embodiments, the parking policy database of Server 130 may be used to provide for an automatic system that authorizes payment for parking using parking payment service in an automatic manner. The automatic system may authorize payment without user intervention in response to detecting a parking event and may stop the payment in response to a parking exit event. In some cases, the user may override the operation of the automatic system and may cancel payment authorization, such as in case the automatic system errs in detecting a parking event, errs in the relevant parking policy. In some cases, the system may correct the parking policy database based on cancelation events that are indicative to a mistake in the parking policy. As an example, a parking spot which the system determined to be a paid parking spot, may in fact have a zone-based parking policy. After several users having vehicles of a relevant zone are detected as parking in the parking location and not paying for the parking (i.e., not turning on the parking payment system or canceling an automatic authorization to the parking payment system to pay for the parking), Server 130 may deduce that there may be a different parking policy that is applicable to those users or their vehicles and it may thereby determine the zone-based parking policy which includes free parking for vehicles from a predestinated zone and paid parking for other vehicles. In some exemplary embodiments, the user may indicate a reason for canceling the initialization of the payment parking system and allow for a better adaptive learning of the automatic system. Additionally or alternatively, the user may It will be noted that Computerized Environment 100 is illustrated with one mobile device. However, the disclosed subject matter is not limited to such an arrangement and any number of mobile devices may be part of a computerized environment according to the disclosed subject matter.

Figure 2A:
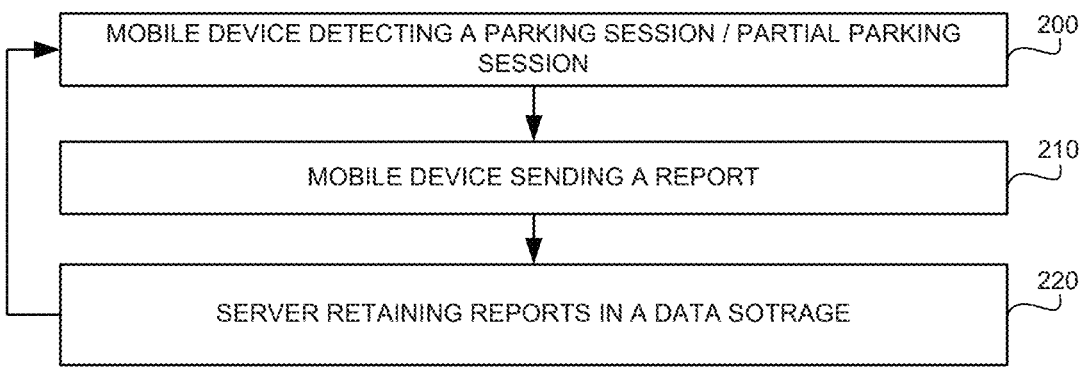
FIG. 2A shows a flowchart diagram of a method, in accordance with some exemplary embodiments of the disclosed subject matter.

Referring now to FIG. 2A showing a flowchart diagram of a method, in accordance with some exemplary embodiments of the disclosed subject matter.

In Step 200, a mobile device may detect a session which may be a parking session or a partial parking session. In some cases, the mobile device may automatically detect the session, such as based on an accelerometer, based on a positioning module, or the like. In some cases, the parking location may be determined using a positioning module which may be activated in response to detecting the parking event or the parking exit event. In some exemplary embodiments, the mobile device may be aware of the identity of the vehicle which is being used, such as based on user input, based on connection to devices mounted on the vehicle, or the like. In some exemplary embodiments, a session may be automatically detected only in case the user is the driver of the vehicle, a determination which may be automatically made based on tracking a usage pattern of the user with the mobile device, sensor readings of the mobile device, or the like.

In Step 210, the mobile device may send a report indicating the session. The report may include information such as parking start time, parking end time, parking location, identifying information of the vehicle or the user, or the like. In some cases, the report may include also information regarding parking payment, such as a rate of payment, a total cost of the parking session, or the like.

In Step 220, a server may receive the report and retain the report in a data storage. The server may receive over time reports from a plurality of mobile devices and may use the reports to generate a database of parking sessions which may be useful for automatically determining parking policies.

In some exemplary embodiments, additional reports may be transmitted to the server, such as reports of canceling automatic parking payment, reports indicating manual notification of an error in a pertinent parking policy, manual correction of a pertinent parking policy, or the like.

Figure 2B:
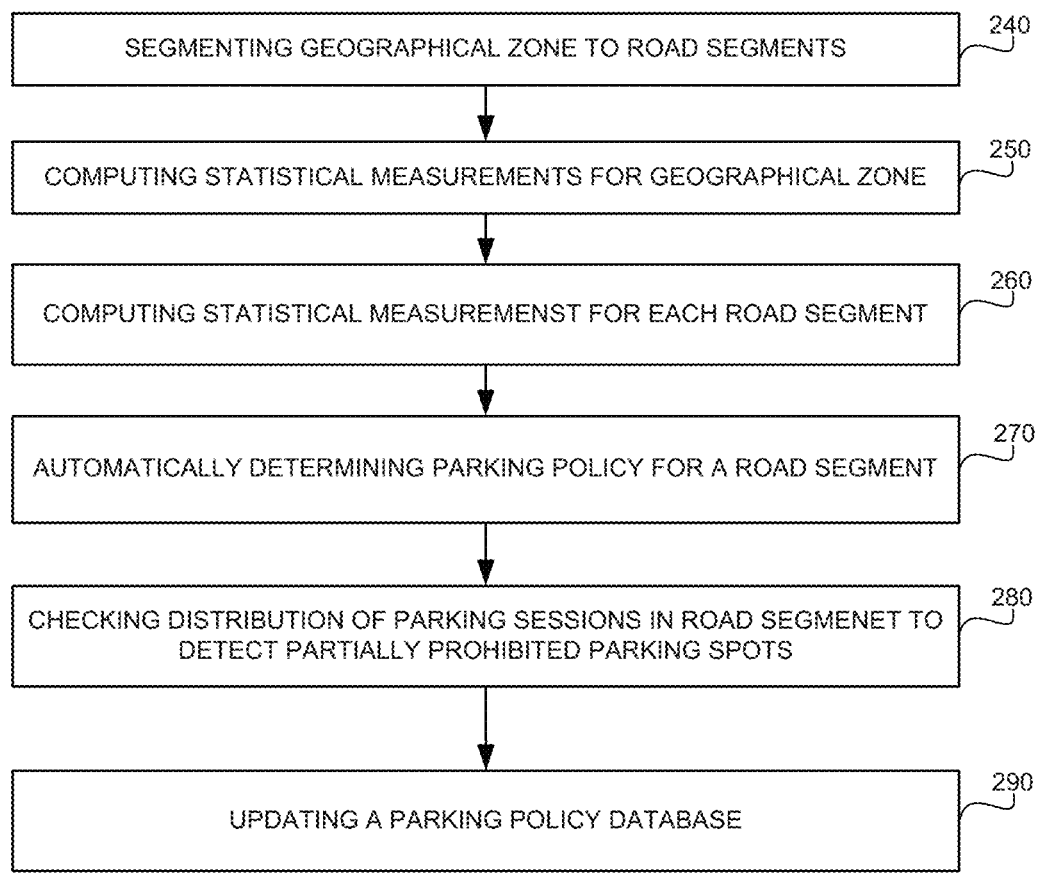
FIG. 2B shows a flowchart diagram of a method, in accordance with some exemplary embodiments of the disclosed subject matter.

Referring now to FIG. 2B showing a flowchart diagram of a method, in accordance with some exemplary embodiments of the disclosed subject matter. The method of FIG. 2B may be performed by a server.

In Step 240, roads of a geographical zone may be segmented to road segments. The roads may be obtained from a mapping database, a mapping service, or the like. The segmentation may be performed so as to produce segments that are bounded in size by a predetermined threshold, such as 100 meters. Additionally or alternatively, the segments may be substantially straight and curves may be used to splits segments.

In some exemplary embodiments, the geographical zone may be a city, a town, a neighborhood or a similar area which generally includes allowed parking spots (e.g., paid or free) and prohibited parking spots. In some cases, the geographical zone may be the entire area which is under the responsibility of a municipality authority or a substantial portion thereof (e.g., 20% of the entire area, 40% of the entire area, and the like).

In Steps 250 and 260, one or more statistical measurement may be computed for the geographical zone and for each road segment. The statistical measurement may be indicative of the parking policy at the road segment. In some exemplary embodiments, the measurement in the road segment may be compared with the geographical zone, which may be used as a benchmark, in order to determine whether parking is permitted or prohibited in the road segment.

In some cases, the statistical measurement may be computed based on parking sessions in the vicinity of the location for which the measurement is computed, such as for example parking sessions having a parking location in a distance of less than predetermined distance (e.g., few meters) from the road segment or which are within the geographical zone. The distance may be computed by computing a distance between a point (e.g., location of the session) and a line (e.g., road segment). In some exemplary embodiments, the statistical measurements may be computed based on reports received at any time or within a sliding window of a predetermined size, such as for example during last hour, during last day, during last week, during last month, or the like. In some exemplary embodiments, the computation may be performed separately for different times of day, different days of the week, weekdays v. weekends, holidays, or the like.

In some exemplary embodiments, the statistical measurement may be computed using computation of mean values of various measurements. In some cases, extreme values may be omitted, such as top and bottom 10%, 20%, 25%, or the like.

In some exemplary embodiments, the statistical measurement may be computed based on clusters of parking sessions having similar characteristics, namely similar vehicles (e.g., vehicles of the same zone, vehicles with disability permits, etc.) and similar timings (e.g., same or similar day and time of day). In some cases, the similar characteristics of the vehicles may be deduced based on information of the users, such as residential address of the users, common, mean or median overnight parking location, or the like.

Non-limiting examples of statistical measurements are provided below. However, the disclosed subject matter is not limited to any particular measurement and other statistical measurement may be used in addition to or instead of any of the exemplary statistical measurement.

In some exemplary embodiments, the statistical measurement may be an average duration of parking sessions. In some exemplary embodiments, a relatively short average duration (e.g., 5 minutes, 10 minutes, or the like) may be indicative of a prohibited parking spot. In some cases, if the average duration of a parking session in the parking location is less than the average duration of parking session in the geographical zone, it may be deduced that the parking location is a prohibited parking location. In some cases, the determination of a prohibited parking location may be if the average duration of parking sessions in the parking location is less than a percentage of the average parking duration in the geographical zone, such as for example, 20%, 50%, or the like.

In some cases, paid parking may be limited by a maximal threshold, such as 15 minutes, two hours, three hours, or the like. In some exemplary embodiments, an average duration of parking sessions may also be useful to deduce the maximal allowed parking time. The maximal allowed parking time may also be considered as part of the parking policy of a paid parking spot.

In some exemplary embodiments, the statistical measurement may be a mean walking distance from a parking spot to a location for which the statistical measurement is computed. The mobile device may track user movement after parking and determine whether the users walked by the location. The walking distance may be reported and an average walking distance may be computed for a parking location, a road segment, a geographical zone, or the like. Generally, a longer mean walking distance measurement may be indicative of a prohibited parking spot. In some exemplary embodiments, the report may include a target destination of the user, which may be manually provided by the user as input, for example, to a navigation system or which may be automatically determined based on the activity of the user after the vehicle is parked (e.g., walking, stopping in a location, or the like). In case the location for which the measurement is computed is substantially (e.g., exactly or by a minor adjustment, such as of 10%, 20%, or the like) between the actual parking location and the target location, the walking distance is estimated as the distance between the actual parking location and the location. In some exemplary embodiments, the mean walking distance may be normalized to a scale between zero and one.

In some exemplary embodiments, the statistical measurement may be based on partial parking sessions. In some exemplary embodiments, a ratio between number of partial parking events and number of parking events (or, alternatively, a total number of partial parking events and parking events) in the road segment/geographical zone for which the measurement is computed. A ratio which indices a relatively high percentage of partial parking events may be indicative that people are often dropped off in the location and vehicles are not actually being parked. Such high percentage may be indicative of a prohibited parking policy.

In some exemplary embodiments, the statistical measurement may be a ratio between parking sessions of users that reside in a vicinity of the location for which the measurement is computed and between parking sessions of users that reside elsewhere. The residence of the user may be determined based on the overnight parking sessions of the user, such as for example as a median, common, or mean overnight parking location.

In some exemplary embodiments, the statistical measurement may be a ratio between overnight parking sessions and all parking sessions in a location for which the statistical measurement is computed. Such statistical measurement may be indicative of whether the location is in a residential area or industrial area. In some cases, parking policies may differ between such areas. For example, paid parking may be more common in industrial areas.

In Step 270, parking policy for a road segment may be automatically determined. The parking policy may be determined for timeframes, such as time of day, time of week, or the like. In some exemplary embodiments, the one or more statistical measurement of the road segment may be compared with a benchmark of the statistical measurements of the geographical zone to determine whether parking is allowed or prohibited. As a non-limiting example, prohibited parking policy may be determined for a road segment for which the following is held: $MWDs+PPSR_s > \alpha(MWDg+PPSR_g)$, where MWDs and MWDs are the mean walking distances of the road segment and the geographical zone, respectively; $PPSR_s$ and $PPSR_g$ are the partial parking sessions ratio of the road segment and the geographical zone, respectively; and $\alpha$ is a predetermined constant.

In some exemplary embodiments, based on payment information, allowed parking spots may be determined to be paid parking spots or free parking spots. In some exemplary embodiments, based on different reports by groups of mobile devices, zone-based parking policy or partially prohibited parking policy may be determined.

In Step 280, after a parking policy for a segment is determined, distribution of parking sessions in the segment may be examined to detect an anomaly. A parking spot in the segment for which the users of the parking sessions are inconsistent with the general distribution of the users of the parking sessions in the segment may be identified and examined to check for a specific parking policy for the parking spot. The parking policy may be a partially prohibited parking policy. As an example, in case of a reserved parking spot, only a single vehicle may be parked in the reserved parking spot, as opposed to the rest of the road segment. As another example, in case of a handicapped parking spot, most parking sessions would be associated with vehicles having a disability label, as opposed to the rest of the road segment.

In Step 290, the parking policy database may be updated based on the parking policies determined by the method. In some exemplary embodiments, after the method is performed parking policy for some road segments would still be unknown, while for some it may be determined to be paid parking policy, for others—free parking policy, for others—prohibited parking policy, and for others—partially prohibited parking policy.

In some exemplary embodiments, the method of FIG. 2B may be performed repeatedly to update the parking policy database based on new reports thereby fixing incorrect determinations over time, updating the database to reflect change in parking policies, or the like.

Figure 3A:
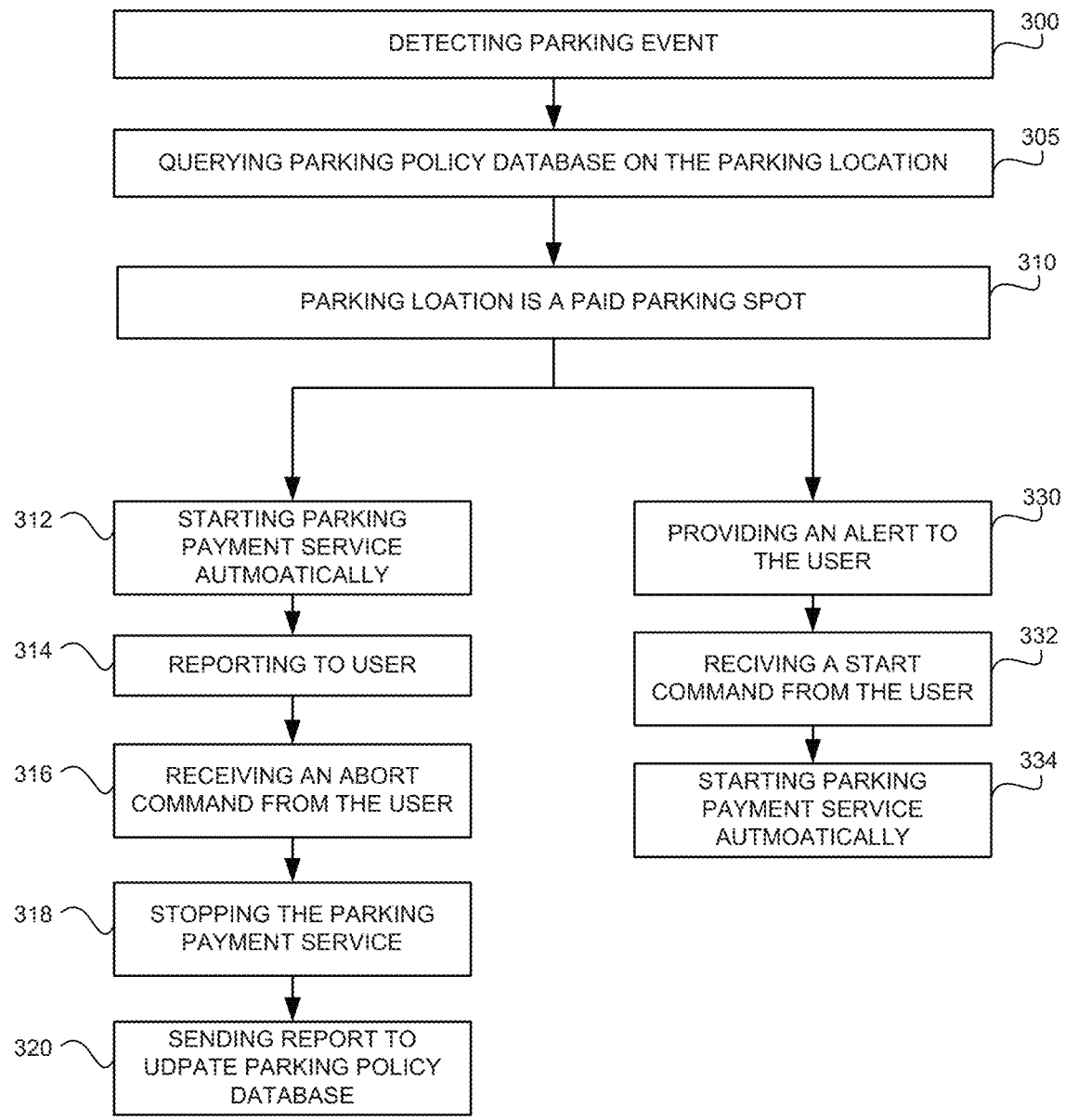
FIGS. 3A-3C show flowchart diagrams of methods, in accordance with some exemplary embodiments of the disclosed subject matter.

Referring now to FIG. 3A showing a flowchart diagram of a method, in accordance with some exemplary embodiments of the disclosed subject matter. The method of FIG. 3A may be performed by a mobile device, such as 110 of FIG. 1.

In Step 300, a parking event may be detected. In some cases, the parking event may be detected automatically by the mobile device based on the sensors of the mobile device.

As an example, accelerometer readings may be used to detect parking event. As an another example, the parking event may be detected based on a detection that the mobile device is in proximity of an RF identifier identifying a parking spot for over a predetermined amount of time (e.g., one minute, 20 seconds, etc.). Additionally or alternatively, the user may manually report the parking event.

In some cases, the parking event may be associated with a parking location. The parking location may be determined by a positioning module. In some exemplary embodiments, the positioning module may be turned on and utilized in response to detecting the parking event so as to conserve battery. Alternatively, in case the parking spot is identified, the parking location of the parking spot may be known or retrieved from a database.

In Step 305, a parking policy database, such as retained in Server 130 of FIG. 1, may be queried to retrieve a parking policy of the parking location. The query may be configured to retrieve the parking policy that is currently applicable, such as parking policy of the present time of day, of a present time of week, of a present time of year, respective to the zone of the vehicle of the user, respective to the license plate of the vehicle, respective to the disability label of the vehicle, or the like.

In some cases, a local replica of the parking policy database or portion thereof may be locally stored in the mobile device thereby enabling the query to be performed without use of communication bandwidth.

In some cases, the parking location is determined to be a paid parking spot (310) (e.g., generally or with respect to the zone of the vehicle, the current time slot, or the like).

Steps 312-320 generally depict an automatic initiation of a parking payment service.

In Step 312, in response to the detection of the parking event in a paid parking spot, the parking payment service may be initiated. Mobile device may be authorized to charge a pre-existing account in the parking payment service. Accordingly, the mobile device may automatically authorize the use of the pre-existing account for the parking sessions which was detected as starting.

In some cases, a report may be issued to the user (314). The report may indicate to the user that the parking payment service has been initiated. Additionally or alternatively, the alert may indicate the parking policy, such as a price rate for the parking, limitations on parking times, or the like. In some cases, the alert may be accompanied by a single button, clickable link, or a similar GUI element, which when the user interacts with is configured to abort the parking payment service. A command from the user to abort the parking payment service may be received (316), and accordingly, if the parking payment service may be aborted (318). In some cases, if the initiation of the parking payment service has been completed, the parking payment service may be stopped.

In some cases, in case the user decides to stop the parking payment service, the mobile device may send a report to a server, such as Server 130, that may be used for enhancing future performance of the system. As an example, the user may be exempt from paying for parking due to a zone of the vehicle, disability label, or the like. The report may be used to update the parking policy database, the characterization of the user in the system, the characterization of the vehicle in the system, or the like. As another example, the user may have not parked a vehicle and the detection in Step 300 may be incorrect. The report may be used to improve future detection of parking events.

Steps 330-334 generally depict a semi-automatic initiation of a parking payment service.

In Step 330, an alert may be issued to the user of the mobile device. The alert may indicate to the user that the user had parked in the paid parking location and that payment is required. In some cases, the alert may be issued after it is determined that the user had not already manually initiated the parking payment service. In some cases, the alert may indicate the parking policy, such as a price rate for the parking, limitations on parking times, or the like. In some cases, the alert may be accompanied by a single button, clickable link, or a similar GUI element, which when the user interacts with is configured to initiate the parking payment service. A command from the user to initiate the parking payment service may be received (332), and the parking payment service may be started in response to such command (334). In some cases, the mobile device may have configured a pre-existing account in the parking payment service. The mobile device may use pre-existing account in the parking payment service for the paid parking session.

In some cases, in case the user decides not to start the parking payment service, the mobile device may send a report to a server, such as Server 130, that may be used for enhancing future performance of the system. As an example, the user may be exempt from paying for parking due to a zone of the vehicle, disability label, or the like. The report may be used to update the parking policy database, the characterization of the user in the system, the characterization of the vehicle in the system, or the like. As another example, the user may have not parked a vehicle and the detection in Step 300 may be incorrect. The report may be used to improve future detection of parking events.

Figure 3B:
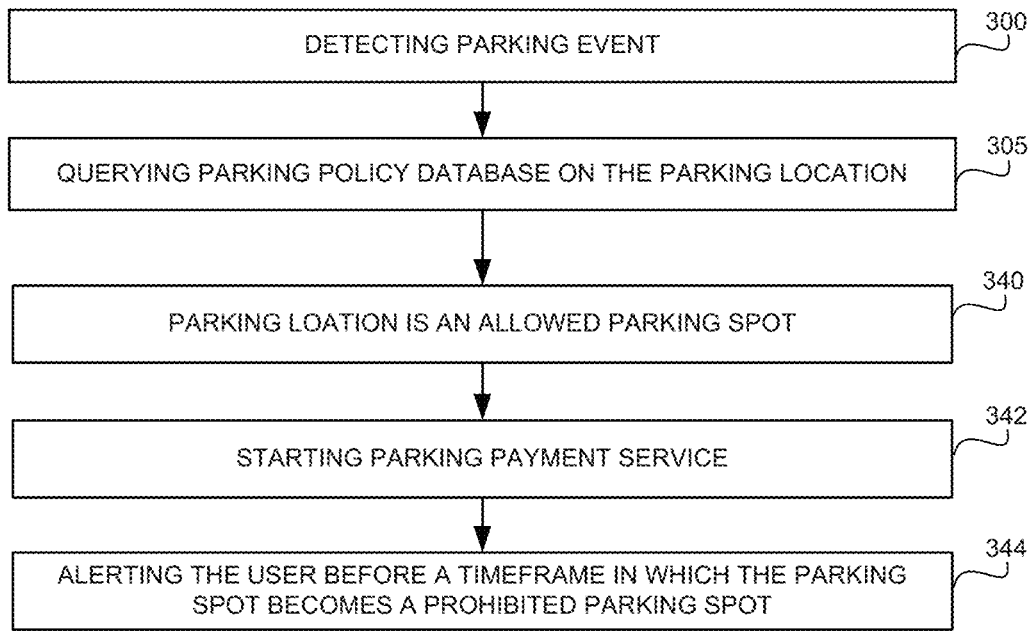

Referring now to FIG. 3B showing a flowchart diagram of a method, in accordance with some exemplary embodiments of the disclosed subject matter. The method of FIG. 3A may be performed by a mobile device, such as 110 of FIG. 1.

After a parking event is detected (300), a query to a parking policy database is performed (305) to determine that the vehicle of the user may park in the parking location (340). The parking spot may have a time-based parking policy which may change over time. The parking spot may be an allowed parking spot (either a free parking spot or a paid parking spot) for the time being, but may become a prohibited parking spot—either with respect to all users/vehicles, or the user/vehicle—in a later time. An alert may be issued before the timeframe in which the parking spot becomes a prohibited parking spot (342). In some exemplary embodiments, the alert may be issued sufficient time prior to the beginning of the timeframe to allow the user to move the parked vehicle. The timing of the alert may be based on estimated walking distance from the location of the mobile device to the parking location. Additionally or alternatively, the timing may be provided a predetermined time prior to the beginning of the timeframe, such as one hour before, 20 minutes before, 10 minutes before, or the like. In some exemplary embodiments, the parking time may be close to the beginning of the timeframe, such as 5 minutes prior to the beginning, 10 minutes before, 30 minutes before, or the like. In such a case, the alert may be provided immediately to the user in response to detecting the parking event (300).

In some exemplary embodiments, the behavior of the user after the alert has been issued may be reported to a server, such as Server 130. The report may be used for enhancing future performance of the system.

Figure 3C:
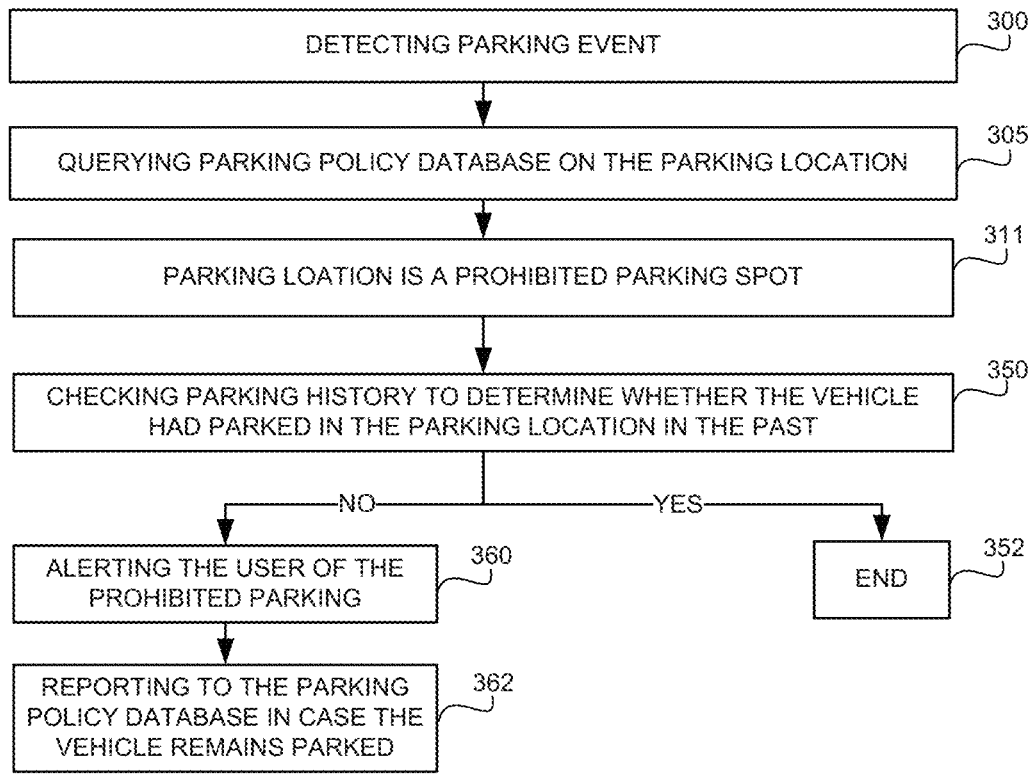

Referring now to FIG. 3C showing a flowchart diagram of a method, in accordance with some exemplary embodiments of the disclosed subject matter. The method of FIG. 3B may be performed by a mobile device, such as 110 of FIG. 1.

In response to a detection of a parking event (300) and a query to the parking policy database (305), the parking location may be determined to be a prohibited parking spot (311), either generally or to the present conditions such as user, vehicle, time, etc. A history of parking events, retained either locally or remotely, may be accessed to determine whether the user had parked the vehicle in the parking location in the past (350). exemplary embodiments, the check may correspond to the present conditions of the parking event, such as user, vehicle, time, etc. In some exemplary embodiments, the check may be focused on the user himself (e.g., using other vehicles, e.g., also a second car), on the vehicle (by other users, e.g., also the spouse of the user), a combination thereof or the like. In some In some exemplary embodiments, a number of times that the same parking location was used in the past may be determined and compared with a predetermined threshold, such as one, five, ten, or the like.

In case the number of historic parking sessions is below the threshold, Steps 360-362 may be performed. An alert may be issued to the user (350), such as using a pop-up message in the mobile device, a push notification in the mobile device, or the like. The alert may indicate to the user that the parking location is a prohibited parking session. The user may ignore the alert or actively dismiss it. In some cases, the user may report a mistake and a report may be transmitted to update the parking policy database. Additionally or alternatively, in case the user ignores or dismisses the alert without requesting to report a mistake to the parking policy database, a report may be automatically transmitted without user intervention if the vehicle remains parked. In some exemplary embodiments, a report may be transmitted automatically and without user intervention. In some cases, the report may be transmitted only after the parking session exceeds a minimal time duration, such as five minutes, ten minutes, or the like, so as to avoid reporting an allowed parking spot based on a short illegal parking session, such as for example double parking, parking in a reserved parking for a short term, or the like.

In case the number of historic parking sessions is above the predetermined threshold, no action may be taken (352), as it may be assumed that the present conditions were manually determined to be irrelevant to the user, vehicle, time, or the like. In some exemplary embodiments, a report may be transmitted automatically and without user intervention. In some cases, the report may be transmitted only after the parking session exceeds a minimal time duration, such as five minutes, ten minutes, or the like, so as to avoid reporting an allowed parking spot based on a short illegal parking session.

Figure 4:
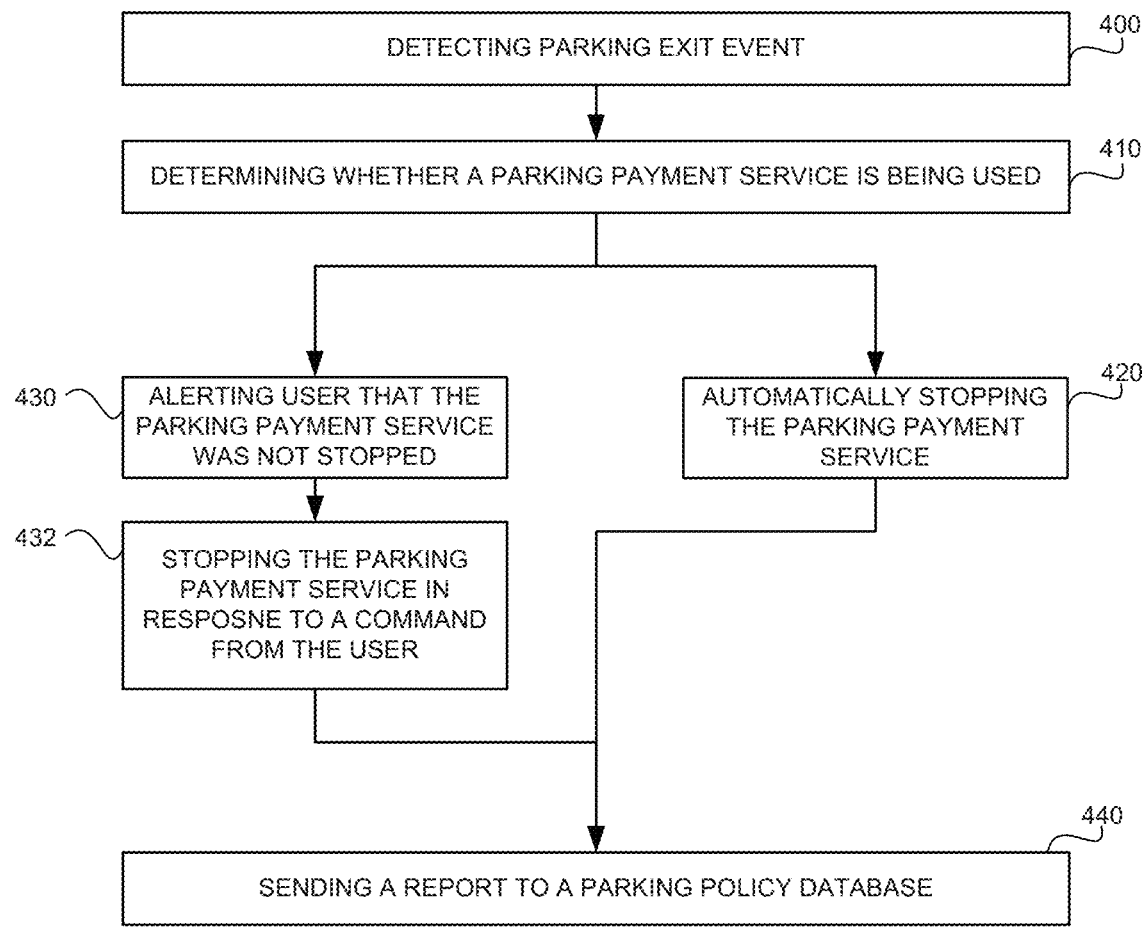
FIG. 4 shows a flowchart diagram of a method, in accordance with some exemplary embodiments of the disclosed subject matter.

Referring now to FIG. 4 showing a flowchart diagram of a method, in accordance with some exemplary embodiments of the disclosed subject matter. The method of FIG. 4 may be performed by a mobile device, such as 110 of FIG. 1.

In Step 400, a parking exit event may be detected. In some cases, the parking exit event may be detected automatically by the mobile device based on the sensors of the mobile device without user intervention. As an example, accelerometer readings may be used to detect parking exit event. As an another example, the parking exit event may be detected based on a detection that the mobile device is in proximity of an RF identifier identifying a parking spot for over a predetermined amount of time (e.g., one minute, 20 seconds, etc.). Additionally or alternatively, the user may manually report the parking exit event. The parking exit event may be determined to be the end of a present parking session which started in a parking event in the same parking location.

In some exemplary embodiments, the parking exit event may be preceded by a parking event in a different location. Such event may indicate that the previous parking session was a partial parking event. In some exemplary embodiments, in such a case the disclosed subject matter may not proceed to perform the following steps of the method of FIG. 4. Additionally or alternatively, a report may be provided to the parking policy database.

In Step 410, it may be determined whether or not a parking payment service is being used. The determination may be automatic. In some exemplary embodiments, the determination may be performed by accessing history records of the mobile device which indicate communication events, such as recent calls, sent text messages, or the like. The history records may reflect contacting the parking payment service to start the payment without reflect a following communication to stop the parking payment service. In some exemplary embodiments, each communication event to the parking payment service may be determined to be associated with starting or stopping the service based on its time and its comparison to the parking event or parking exit event of the present parking session. Additionally or alternatively, the mobile device may monitor activity of an app associated with the parking payment service. Additionally or alternatively, the mobile device may send a query to the parking payment service to retrieve information regarding the user, vehicle, mobile device or the like. The retrieved information may indicate whether the parking payment service is currently being used.

In Step 420, the parking payment service may be automatically stopped without any user intervention.

In some exemplary embodiments, Step 430 may be performed. In Step 430, an alert may be provided to the user indicating that the parking payment service is being used and was not yet stopped. The user may stop the parking payment service (432). In some exemplary embodiments, the user may manually stop the parking payment by accessing the parking payment service and instructing to stop the payment. Additionally or alternatively, the mobile device may stop the parking payment automatically in response to a command received from the user, such as pressing a button or interacting with a similar GUI object that is provided to the user alongside the alert.

In Step 440, a report may be transmitted to the parking policy database. The report may comprise information regarding the parking session which ended, such as but not limited to parking location, user, vehicle, parking duration, total cost of parking session, parking rate, parking session start time, parking session end time, or the like.

In some exemplary embodiments, the disclosed subject matter may be applicable to computing devices other than mobile devices, such as for example, a car information system mounted in the vehicle. In some exemplary embodiments, the computing device may be used to query a parking policy database and provide reports on user actions that are either consistent or inconsistent with parking policies. In some exemplary embodiments, a display of the computing device, such as a non-mobile screen mounted on or near the dashboard, may be used to display information to the user, such as information regarding parking policy in a present location of the vehicle. The computing device may report activity of the vehicle to the parking policy database for analysis, in accordance with the disclosed subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method performed by a server having a processor, wherein the server is connected to a computerized network to which mobile devices are connected, wherein said method comprises:
    receiving, over time, reports from the mobile devices, wherein the reports are indicative of parking sessions of vehicles of users of the mobile devices;
    segmenting a geographical zone into road segments;
    computing a statistical measurement for each road segment, wherein the statistical measurement is indicative of a parking policy in the road segment;
    computing the statistical measurement for the geographical zone, wherein the statistical measurement is based on partial parking sessions, wherein a partial parking session is a parking session for which a parking event is automatically detected by the mobile device, and a corresponding exit parking event is not detected; and
    automatically determining the parking policy in each road segment based on a relation between the statistical measurement of the road segment and between the statistical measurement of the geographical zone, whereby determining at least a parking policy for a first road segment includes determining that parking is not allowed at a location based on a rate of partial parking sessions at the location;
    detecting by a mobile device from the mobile devices a parking event of a vehicle in a parking location within the first road segment from the road segments, wherein the parking location is determined using a positioning module activated in response to detecting the parking event; and
    issuing an alert to a user of the vehicle before the parking location becomes a prohibited parking spot in accordance with the parking policy determined for the first road segment.

2. The method of claim 1, wherein the statistical measurement is an average parking duration.

3. The method of claim 1, wherein the statistical measurement is a mean distance from a parking spot to a location for which the statistical measurement is computed.

4. The method of claim 3, wherein the reports from the mobile devices are further indicative of a target destination, wherein the mean distance is computed based on reports of parking sessions in which the location is substantially between a parking spot of the parking session and the target destination.

5. The method of claim 1, wherein the statistical measurement is a ratio between parking sessions of users that are residing in a vicinity of a location and parking sessions of users that do not reside in the vicinity of the location, wherein the location is a location for which the statistical measurement is computed, wherein a residence of a user is determined automatically by said server based on overnight parking sessions of the user.

6. The method of claim 1, wherein the statistical measurement is a ratio between overnight parking sessions and all parking sessions.

7. The method of claim 1 further comprising:
    checking distribution of parking sessions along a road segment;
    detecting a location in the road segment for which parking sessions are inconsistent with the distribution of parking sessions along the road segment; and
    determining the location is a partially prohibited parking spot, wherein the partially prohibited parking spot is a partially prohibited parking spot which is prohibited for a first group of one or more vehicles and allowed for a second group of one or more vehicles.

8. The method of claim 7 further comprising automatically determining a characterization of the second group based on the parking sessions in the partially prohibited parking spot.

9. The method of claim 1, wherein for at least one road segment a parking policy is determined to be unknown.

10. The method of claim 1, wherein a portion of the reports is associated with paid parking, wherein the portion of the reports indicate a payment rate for the parking sessions, and wherein for at least one road segment the parking policy is a paid parking policy which is determined based on the portion of the reports.

11. The method of claim 1, wherein said automatically determining comprises determining for a road segment a zone-based parking policy, wherein the zone-based parking policy allows vehicles of a predetermined zone to park without a payment.

12. The method of claim 11, wherein the zone-based parking policy allows vehicles not of the predetermined zone to park with a payment.

13. The method of claim 11, wherein the zone-based parking policy prohibits vehicles not of the predetermined zone to park at predetermined a timeframe.

14. The method of claim 1, further comprising:
    subject to the parking spot being a paid parking spot in accordance with the parking policy determined for the first road segment, automatically starting a parking payment service for the user.

15. A server having a processor, wherein the server is connected to a computerized network to which mobile devices are connected, wherein the processor being adapted to perform the steps of:
    receiving, over time, reports from the mobile devices, wherein the reports are indicative of parking sessions of vehicles of users of the mobile devices;
    segmenting a geographical zone into road segments;
    computing a statistical measurement for each road segment, wherein the statistical measurement is indicative of a parking policy in the road segment;
    computing the statistical measurement for the geographical zone, wherein the statistical measurement is based on partial parking sessions, wherein a partial parking session is a parking session for which a parking event is automatically detected by the mobile device, and a corresponding exit parking event is not detected;
    automatically determining the parking policy in each road segment based on a relation between the statistical measurement of the road segment and between the statistical measurement of the geographical zone, whereby determining at least a parking policy for a first road segment includes determining that parking is not allowed at a location based on a rate of partial parking sessions at the location;

detecting by a mobile device from the mobile devices a parking event of a vehicle in a parking location within the first road segment from the road segments, wherein the parking location is determined using a positioning module activated in response to detecting the parking event; and issuing an alert to a user of the vehicle before the parking location becomes a prohibited parking spot in accordance with the parking policy determined for the first road segment.

16. The server of claim 15, wherein the processor is further adapted to perform:

subject to the parking spot being a paid parking spot in accordance with the parking policy determined for the first road segment, automatically starting a parking payment service for the user.

* * * * *